United States Patent [19]

Boehmke et al.

[11] B 3,925,367
[45] Dec. 9, 1975

[54] PYRAZOLINE BRIGHTENERS

[75] Inventors: Gunther Boehmke; Hans Theidel, both of Leverkusen, Germany

[73] Assignee: Bayer Aktiengesellschaft, Leverkusen-Bayerwerk, Germany

[22] Filed: Oct. 15, 1971

[21] Appl. No.: 189,772

[44] Published under the Trial Voluntary Protest Program on January 28, 1975 as document no. B 189,772.

[30] Foreign Application Priority Data
Oct. 15, 1970 Germany............................ 2050725

[52] U.S. Cl..................260/239.65, 252/301.2 W, 252/301.3 W, 260/243 B, 260/239.7, 260/239.8, 260/239.9, 260/247.1, 260/247.2 B, 260/247.5, 260/293.7, 260/310 D

[51] Int. Cl.$^2$...................................... C07D 231/06

[58] Field of Search.......... 260/310 D, 239.6, 239.8, 260/239.9, 239.7

[56] References Cited
UNITED STATES PATENTS

| | | | |
|---|---|---|---|
| 3,141,879 | 7/1964 | Hausermann et al............ | 260/247.2 |
| 3,629,241 | 12/1971 | Krause et al..................... | 260/239.9 |

FOREIGN PATENTS OR APPLICATIONS

| | | | |
|---|---|---|---|
| 906,960 | 9/1962 | United Kingdom............. | 260/310 D |
| 1,080,963 | 10/1960 | Germany ........................... | 260/310 |
| 1,155,418 | 4/1964 | Germany ........................... | 260/310 |
| 661,139 | 9/1965 | Belgium ........................... | 260/310 |
| 670,161 | 3/1966 | Belgium ........................... | 260/310 |
| 727,656 | 7/1969 | Belgium | |

*Primary Examiner*—Henry R. Jiles
*Assistant Examiner*—C. M. S. Jaisle
*Attorney, Agent, or Firm*—Plumley & Tyner

[57] ABSTRACT

Pyrazoline compounds of the formula

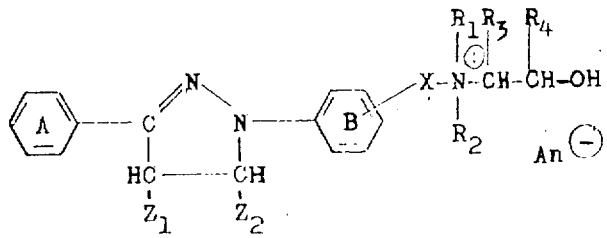

in which
$R_1$ and $R_2$ represent an alkyl, cycloalkyl or aralkyl radical or together with the N atom form a non-aromatic, heterocyclic ring,
$R_3$ and $R_4$ denote hydrogen or an alkyl or aryl radical,
X denotes alkylene, -O-alkylene, -SO$_2$-alkylene or —SO$_2$NY-alkylene, Y denoting hydrogen or alkyl,
$Z_1$ denotes hydrogen or alkyl,
$Z_2$ denotes hydrogen, alkyl or aryl and
An represents a colourless anion equivalent to the brightener cation,
as well as their preparation and their use as optical brighteners.

4 Claims, No Drawings

PYRAZOLINE BRIGHTENERS

The subject of the present invention are pyrazoline compounds having a quaternary ammonium group of the general formula

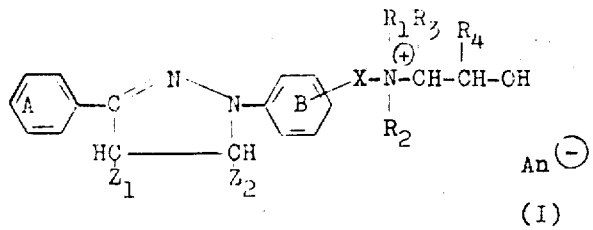

(I)

in which
- $R_1$ and $R_2$ represent an alkyl, cycloalkyl or aralkyl radical or together with the N atom form a heterocyclic ring,
- $R_3$ and $R_4$ denote hydrogen or an alkyl or aryl radical,
- X denotes alkylene, -O-alkylene, -$SO_2$-alkylene or -$SO_2$NY-alkylene,
- Y denoting hydrogen or alkyl,
- $Z_1$ denotes hydrogen or alkyl,
- $Z_2$ denotes hydrogen, alkyl or aryl and
- $An^\ominus$ represents a colourless anion equivalent to the brightener cation, and in which the rings A and B can possess further non-ionic substituents, as well as their manufacture and use as optical brighteners.

Suitable alkyl radicals $R_1$, $R_2$, $R_3$ and $R_4$ are especially those with 1 to 4 C atoms, which can be substituted by halogen, such as fluorine, chlorine and bromine, hydroxyl, nitrile, $C_1$-$C_4$-alkoxy, phenoxy, $C_2$-$C_5$-alkylcarbonyloxy or $C_2$-$C_5$-alkoxycarbonyloxy groups.

Suitable alkyl radicals are, for example: methyl, hydroxymethyl, methoxymethyl, phenoxymethyl, cyanomethyl, ethoxycarbonylmethyl, ethyl, β-hydroxyethyl, β-acetoxyethyl, β-chloroethyl, β-cyanoethyl, carboxyethyl, ethoxycarbonylethyl, methoxyethyl, ethoxyethyl, n- and iso-propyl, n-, iso-, sec.- and tert.-butyl, iso-butenyl, allyl and β-methoxyethenyl radicals.

Suitable cycloalkyl radicals $R_1$ and $R_2$ are cyclopentyl and cyclohexyl radicals.

Suitable aralkyl radicals $R_1$ and $R_2$ are above all benzyl and phenylethyl radicals.

Suitable heterocyclic radicals which $R_1$ and $R_2$ can form together with the N atom are, for example, pyrrolidine, piperidine, imidazole, morpholine and thiomorpholine radicals.

Suitable alkyl radicals Y, $Z_1$ and $Z_2$ are especially unsubstituted alkyl radicals with 1 to 4 C atoms.

Suitable aryl radicals $R_3$, $R_4$ and $Z_2$ are above all phenyl radicals which can be substituted by non-ionic substitutents. By non-ionic substituents which can not only be present in the phenyl radicals $R_3$, $R_4$ and $Z_2$, but also in the rings A and B, there are to be understood the substituents which are customary in the chemistry of brighteners, such as halogen, $C_1$-$C_4$-alkyl, $C_1$-$C_4$-alkoxy, nitrile, carboxylic acid ester and carboxylic acid amide groups.

Possible alkylene radicals X are especially those with 2 to 4 C atoms, in which the carbon chain can be interrupted by hetero-atoms such as O and S, such as -$(CH_2)_2$-, -$(CH_2)_3$-, -$(CH_2)_4$- and -$(CH_2)_2$-O-$(CH_2)_2$-.

By the anion $An^-$ there are to be understood both organic and inorganic ions, for example halogen, such as chloride, bromide and iodide, or hydroxide, carbonate, bicarbonate, alkylsulphate, sulphate, disulphate, perchlorate, phosphate, benzenesulphonate or naphthalenesulphonate, 4-chlorobenzenesulphonate, oxalate, acetate, maleinate, propionate, methanesulphonate, chloroacetate, lactate, tartrate, glycerate, citrate or benzoate ions or complex anions, such as, for example, anions of zinc chloride double salts. The formate ion and above all the acetate ion are to be regarded as particularly suitable.

Preferred compounds within the framework of the formula I are those of the formula

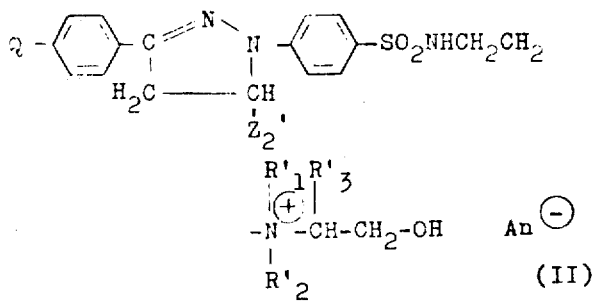

(II)

in which
- $R'_1$ and $R'_2$ represent hydrogen; $C_1$-$C_4$-alkyl radicals which are optionally substituted by chlorine, hydroxyl, nitrile, $C_1$-$C_4$-alkoxy, phenoxy or $C_2$-$C_5$-alkylcarbonyl groups; cyclohexyl or benzyl radicals, or together with the N atom form a pyrrolidine, piperidine, imidazole or morpholine ring,
- $R'_3$ denotes hydrogen or $C_1$-$C_4$-alkyl radicals which are optionally substituted by chlorine, hydroxyl or $C_1$-$C_4$-alkoxy groups,
- $Z'_2$ represents hydrogen or $C_1$-$C_4$-alkyl radicals and
- Q represents hydrogen or chlorine, and
- $An^\ominus$ denotes a colourless anion.

The new pyrazoline compounds of the formula I can be manufactured according to various processes.

These compounds are obtained particularly advantageously if pyrazoline compounds having a tertiary amino group, of the formula

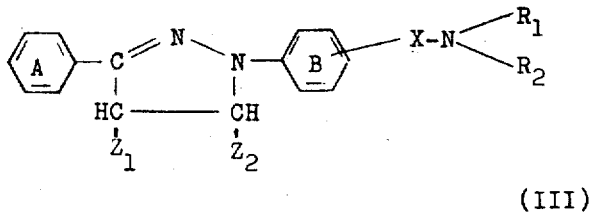

(III)

in which
$R_1$, $R_2$, $Z_1$, $Z_2$, A and B have the abovementioned meaning,
are reacted, that is to say quaternised, with compounds of the formula

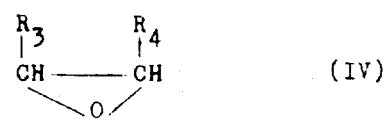

(IV)

in which
$R_3$ and $R_4$ have the abovementioned meaning, preferably in the presence of acids.

Possible starting materials (III) for this quaternisation are preferably those pyrazoline compounds which are described, for example, in German Pat. No. 1,080,963 and Belgian Pat. Nos. 661,139, 670,161 and 727,656.

Suitable quaternising agents of the formula IV are those described in Houben-Weyl, Methoden der Org. Chem., volume VI/3, page 367 and thereafter. As examples, there may be mentioned: ethylene oxide, 1,2-propylene oxide, 1,2-butylene oxide, glycid, methoxyethylene oxide, styrene oxide, phenylglycidyl-ether and epichlorohydrin.

The reaction, according to the invention, of III with IV is preferably carried out in water.

In some cases it has proved advantageous to replace the water partially by water-soluble organic solvents, such as methanol, ethanol, isopropanol, butanol, acetone, methyl ethyl ketone, glycol, propylene gylcol, methyl-, ethyl- and butyl-glycol-ether, formic acid methyl ester, glycerol monoacetate, formamide, dimethylformamide, dimethylsulphoxide and methylpyrrolidone.

The pH value of the reaction mixture, which can rise as far as 13 through formation of the quaternary base, is appropriately kept at 7 - 9 by continuous addition of acid.

Suitable acids are, for example, mineral acids, arylsulphonic acids and lower monobasic and dibasic aliphatic carboxylic acids. The following acids may be mentioned by way of example : hydrochloric acid, hydrobromic acid, sulphuric acid, phosphoric acid, benzenesulphonic acid and toluenesulphonic acid, benzenecarboxylic acid and toluenecarboxylic acid, p-hydroxybenzoic and o-hydroxybenzoic acid, formic acid, acetic acid, propionic acid, lactic acid, malic acid, tartaric acid, citric acid and others.

In individual cases it can also be advantageous to employ the corresponding salts, instead of the free tertiary bases of the compounds of the formula III, for the quaternisation.

The reaction temperatures can be varied over a substantial range.

In general, temperatures of between 0° and 120°C, preferably between 20° and 60°C, are used.

The course of the reaction can be followed both by testing the solution behaviour of the reaction products and by accurate checking of the pH value. As long as a rise in pH value to above pH 9 can still be detected on addition of the alkylene oxide if the addition of acid is briefly interrupted, an alkylation is still taking place.

In the case of weakly basic starting substances of the formula III it is advisable to carry out the process in largely anhydrous solvents which permit protonisation of the tertiary amino group. In particular, lower carboxylic acids, such as formic acid, acetic acid and propionic acid are suitable for this purpose. If these carboxylic acids do not suffice as solvents, yet further organic solvents, such as aromatics, for example, benzene, toluene, xylene, chlorobenzene or dichlorobenzene, or chloroform or carbon tetrachloride, or formic acid esters, acetic acid esters or propionic acid esters, can be added to assist the solubility.

In this procedure, the reaction temperature is kept below 60°C, preferably below 30°C.

A particularly advantageous embodiment of the abovementioned process for the manufacture of the new pyrazoline compounds I is characterised in that the crude, wet press cake of the compounds III, as frequently obtained in the production process, is directly - that is to say without drying and grinding - converted into a slurry with water or one of the abovementioned solvents, or dissolved therein, and thereafter subjected to the action of one of the cyclic ethers IV. In this simple manner, a stable, highly concentrated solution of the pyrazoline compounds I is obtained directly, from which the dyeing solution of the desired concentratin can easily be produced by dilution.

A further process for the manufacture of the new compounds I is characterised in that pyrazoline compounds of the formula

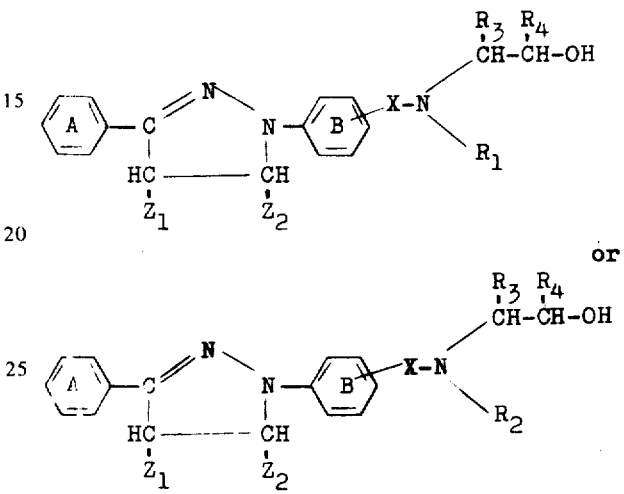

in which
R₁, R₂, R₃, R₄, Z₁, Z₂, X, A and B have the abovementioned meaning, are reacted, that is to say quaternised, with alkylating agents of the formulae R₂-An' or R₁-An' in which
R₁ and R₂ have the abovementioned meaning and An' represents a halogen, alkylsulphate or arylsulphonate ion.

Suitable alkylating agents are: methyl iodide, ethyl bromide, n-butyl chloride, dimethyl sulphate, diethyl sulphate, benzenesulphonic acid methyl ester, p-toluenesulphonic acid ethyl ester and others.

The new pyrazoline compounds of the formula I barely retain any tendency to crystallise and are almost infinitely soluble in water as well as in polar organic solvents. They are therefore much more suitable than the nearest comparable quaternary pyrazoline bases, known from German Pat. Specification 1,155,418 and Belgian Pat. Specifications 661,139 and 670,161, for the manufacture of concentrated, stable, liquid compositions such as are required, say, for automatically controlled processes for the treatment of fibres and fabrics.

In contrast to the conventional methods for the manufacture of liquid compositions of optical brighteners, which are characterised by the use of special solvents for the types of brighteners already known as powder products, and by the use of special counter-ions - for example acetate ions instead of the otherwise customary halide ions and sulphate ions - the process according to the invention for the manufacture of liquid compositions is characterised by lesser technical effort and hence by a considerable saving in cost.

Furthermore, the conventional replacement of, for example, halide ions by, for example, acetate ions, which is only possible via the bases liberated by alkali, cannot always be carried out technically. Thus, in the case of compounds with easily hydrolysable groups, the process according to the invention (according to page 4) is the only way which can be followed for the manufacture of the new pyrazoline compounds (I) having any desired anions.

Eqaully, the use of special solvents, solubilising agents and their auxiliaries for the manufacture of concentrated solutions frequently presents greater difficulties in the case of brighteners than, for example, in the case of dyestuffs, since in the case of brighteners it can result in very severe colour shade distortions (for example development of a green tone), reduction in fluorescence and even, for example if molecular adducts are formed, quenching of the fluorescence.

The brightener solutions obtained according to the process of the invention are outstandingly suitable for the brightening of fibres, yarns, fabrics and films of polyacrylonitrile and of copolymers mainly containing polyacrylontrile, as well as of acid-modified polyesters and polyamides.

EXAMPLE 1

100 g (0.24 mol) of the 3-(4-chlorophenyl)-1-[4-(N'-dimethylaminopropyl-sulphamido)-phenyl]-pyrazoline according to German Pat. Specification No. 1,080,963 are suspended in 300 cm³ of water. The external, tertiary nitrogen is quaternised by passing in approx. 18 g of ethylene oxide at 40° –50°C. During the reaction, the pH value is measured and kept at a pH value of between 8 and 9.5 by continuous addition of a total of approx. 16 g of acetic acid. At the end of the quaternisation (after 3 - 4 hours) the basic brightener has dissolved completely and does not crystallise out even on cooling the slightly brownish, clear solution. The pH value is adjusted to 7. An approx. 30 percent strength stable aqueous solution is thus obtained, which displays excellent technical use properties and which can be employed both in the customary brightening of polyacrylonitrile fabrics and filaments in a dyeing bath and in the treatment of freshly spun filaments in the precipitation- bath or after-treatment bath. The fact that the clear, mobile solution can be mechanically metered continuously is particularly advantageous. The affinity of the brightener has not been unfavourably affected even when using a dilute liquor.

EXAMPLE 2

100 g of the brightener employed in Example 1 are dissolved in 300 g of water and 15 g of acetic acid at 50°C. Approx. 25 g of propylene oxide are added dropwise whilst stirring. The temperature is kept at 50° – 60°C. After about 5 hours the solution is stable even if cooled. As in Example 1, a weakly brownish, approx. 30 percent strength brightener solution of excellent technical use properties is obtained. Quaternisation of the starting product with dimethyl sulphate leads to a brightener which only dissolves in water to the extent of approx. 10 percent.

EXAMPLE 3

100 g of the brightener of the formula

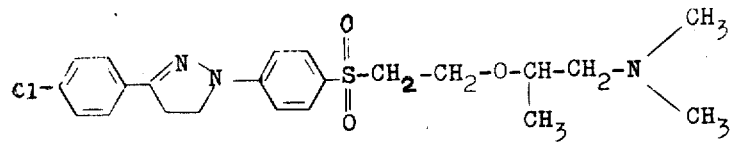

(according to Belgian Pat. Specification 670,161) in 350 cm³ of water are quaternised with approx. 18 – 20 g of ethylene oxide and approx. 15 g of acetic acid in accordance with the process of Example 1. An 18 percent strength solution which is stable to cold and to alkaline pH values is obtained.

EXAMPLE 4

100 g of the 3-4-chlorophenyl)-1-[4-(N'-methylpiperazyl-sulphamido)-phenyl]-pyrazoline are suspended in 250 g of water and 50 g of isopropanol. Approx. 20 g of ethylene oxide are passed in at about 40°C. Whilst passing it in, the pH value is kept at 8 – 9.5 by dropwise addition of approx. 28 g of lactic acid whilst continuously checking the pH, and at the end of the reaction the value is adjusted to pH 7. The resulting 28 percent strength brightener solution is stable on storage and the product gives very good brightening effects on polyacrylonitrile and acid-modified polyester fibres.

EXAMPLE 5

100 g of the brightener employed in Example 1 were suspended in 100 cm³ of water and 200 cm³ of methanol. 36 g of styrene oxide and 18 g of acetic acid were simultaneously added dropwise at a temperature of about 50° – 60°C, whilst stirring and checking the pH value as in Example 1. After a reaction time of 3 – 4 hours the solution has become clear and on dilution in water is soluble without cloudiness. The methanol is distilled off in vacuo and a clear, non-crystallising, approximately 65 percent strength aqueous brightener solution is obtained. The brightener can be diluted with water to any desired concentration. The affinity of the brightener is excellent.

EXAMPLE 6

100 g of the brightener according to Example 4 are dissolved in 150 cm³ of water and 200 cm³ of methanol by means of 13.5 g of formic acid. 45 g of 3-phenoxypropylene oxide (phenyl-glycidyl-ether) are added dropwise over the course of about 4 hours at a temperature of 40° –50°C. Towards the end of the reaction, the pH value is checked and readjusted to approx. 7 with formic acid, if necessary. The methanol is distilled off in vacuo and a 50 percent strength aqueous brightener solution is obtained which is stable on storage and shows excellent technical use properties.

EXAMPLE 7

100 g of the brightener of the following formula

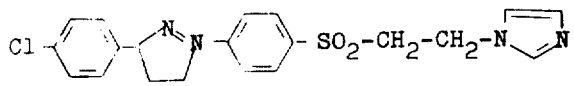

(according to Belgian Pat. Specification 727,656) are dissolved in 100 g of formic acid and 300 g of benzene at 50° – 60°C. Ethylene oxide is passed into this solution until a benzene-free sample gives a clear solution in water and dilute ammonia.

The benzene is then distilled off in vacuo and the residue is made up to 400 g with water. A 30 percent strength, clear brightener solution which is stable on storage is obtained.

Further brighteners of excellent technical use properties are obtained if the technically advantageous process of Examples 1, 6 or 7 is followed and, in accordance with the starting products, the following brighteners are manufactured:

2. Pyrazoline compound of the formula

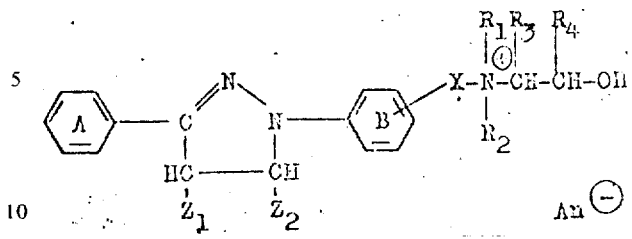

| Substituent in A | $Z_1$ | $Z_2$ | Substituent in B | X | Quaternary group $-\overset{\oplus}{N}-$ | Anion |
|---|---|---|---|---|---|---|
| Cl-(4)- | H | H | - | $-SO_2-CH_2-CH_2-$ | $-N\underset{\diagup}{\overset{\diagdown}{\phantom{X}}}N-CH_2-CH_2OH$ | $HCOO^-$ |
| $CH_3-(4)-$ | H | H | - | $-SO_2-NH-CH_2-CH_2-CH_2-$ | $-\underset{CH_3}{\overset{CH_3}{N}}-CH_2-CH\underset{OH}{-}\!\!\bigcirc$ | $CH_3COO^-$ |
| Dichloro-(3,4)- | H | H | - | $-SO_2-NH-CH_2-CH_2-CH_2-$ | $-\underset{CH_3}{\overset{CH_3}{N}}-CH_2-CH_2-OH$ | $CH_3-CH-COO^-$ $\phantom{CH_3-}OH$ |
| CN-(4)- | H | H | - | $-SO_2-NH-CH_2-CH_2-CH_2-$ | $-N\underset{C_4H_9}{\overset{C_4H_9}{\diagup}}-CH_2-CH_2-OH$ | $HCOO^-$ |
| Cl-(4)- | H | $C_6H_5$ | - | $-SO_2-NH-CH_2-CH_2-CH_2-$ | $-N\underset{\underset{CH_2-CH_2OH}{\phantom{X}}}{\overset{CH_2-CH_2}{\diagup}\diagdown}O$ | $CH_3COO^-$ |
| Cl-(4)- | H | H | - | $-SO_2-NH-CH_2-CH_2-CH_2-$ | $-N\underset{N}{\overset{\phantom{X}}{\diagup\diagdown}}N-CH_2-\underset{OH}{CH}-CH_3$ | $CH_3COO^-$ |
| Cl-(4)- | H | H | - | $-SO_2-\underset{CH_3}{N}-CH_2-CH_2-CH_2-$ | $-\underset{CH_3}{\overset{CH_3}{N}}-CH_2-\underset{OH}{CH}-CH_3$ | $CH_3COO^-$ |

I claim:
1. Pyrazoline compound of the formula

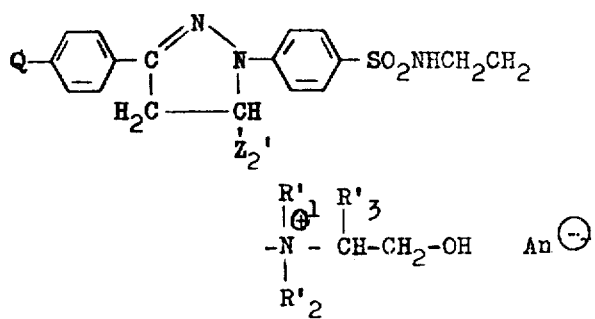

in which
R'₁ and R'₂ represent hydrogen; C₁-C₄-alkyl radicals which are optionally substituted by chlorine, hydroxyl, nitrile, C₁-C₄-alkoxy, phenoxy or C₂-C₅-alkylcarbonyl groups; cyclohexyl or benzyl radicals, or together with the N atom form a pyrrolidine, piperidine, imidazole or morpholine ring,
R'₃ denotes hydrogen or C₁-C₄-alkyl radicals which are optionally substituted by chlorine, hydroxyl or C₁-C₄-alkoxy groups,
Z'₂ represents hydrogen or C₁-C₄-alkyl radicals and Q represents hydrogen or chlorine.

2. Pyrazoline compound of the formula in which $R_1$ and $R_2$ represent hydrogen, $C_{1-4}$-alkyl, $C_{1-4}$-alkyl substituted by a member of the group chloro, fluoro, bromo, hydroxy, cyano, $C_{1-4}$-alkoxy, phenoxy, $C_{2-5}$-alkylcarbonyloxy, and $C_{2-5}$-alkoxycarbonyloxy; cyclohexyl; cyclopentyl; benzyl; phenylethyl; or $R_1$ and $R_2$ together with the N-atom form a heterocyclic ring selected from the group consisting of pyrrolidine, piperidine, imidazole, morpholine, and thiomorpholine; $R_3$ and $R_4$ denote hydrogen, $C_{1-4}$-alkyl, $C_{1-4}$-alkyl substituted by a member selected from the class consisting of chloro, fluoro, bromo, hydroxy, cyano, $C_{1-4}$-alkoxy, phenoxy, $C_{2-5}$-alkylcarbonyloxy and $C_{2-5}$-alkoxycarbonyloxy, or phenyl or phenyl substituted by a member of the class consisting of halogen, cyano, $C_{1-4}$-alkyl, $C_{1-4}$-alkoxy and carbonamide; X denotes alkylene, O-alkylene, $SO_2$-alkylene, or $SO_2$-NY-alkylene wherein Y is H or $C_{1-4}$alkyl and wherein alkylene is a $C_{2-4}$ radical which may contain an intermediate oxygen or sulfur bridge; Y is hydrogen or $C_{1-4}$ unsubstituted alkyl; $Z_1$ is hydrogen or $C_{1-4}$ unsubstituted alkyl; and $Z_2$ is hydrogen, $C_{1-4}$ unsubstituted alkyl, phenyl or phenyl substituted by a member of the group halogen, $C_{1-4}$-alkyl, $C_{1-4}$-alkoxy, cyano, and carbonamide; and An represents a colorless anion equivalent to the brightener cation, and in which A and B independently represent unsubstituted phenyl or phenyl substituted by 1 or 2 members of the group consisting of halogen, $C_{1-4}$alkyl, $C_{1-4}$alkoxy, CN and $CONH_2$.

3. Pyrazoline compound of claim 2 of the formula

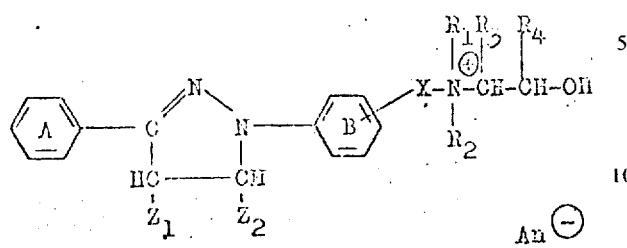

wherein A is substituted by Cl, $CH_3$ CN or di Cl;
B is unsubstituted except for the radical bridged by X
$Z_1$ is H
$Z_2$ is H or phenyl
X is $-SO_2NH\ C_3H_6-$, $-SO_2C_2H_4-O-CH(CH_3)-CH_2-$, $-SO_2NH-$, $-SO_2\ C_2H_4-$, or $-SO_2\ N(CH_3)\ C_3H_6-$;
$R_1$ is $CH_3$ or $C_4H_9$
$R_2$ is $CH_3$ or $C_4H_9$ or $R_1$ and $R_2$ together are N-methyl piperazyl, morpholinyl, imidazolyl, or triazolyl $R_3$ is H $R_4$ is H, $CH_3$, phenyl or phenoxy and An represents a colorless anion equivalent to the brightener cation.

4. Pyrazoline compound of claim 2 with the formula

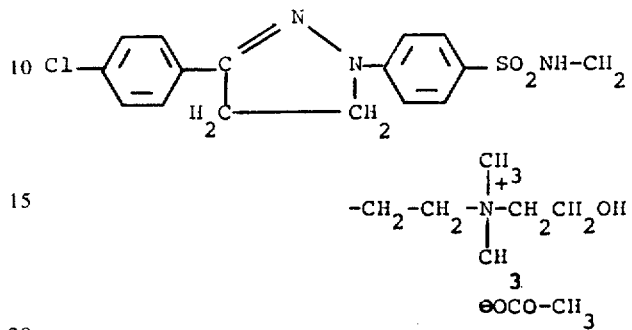

* * * * *